(No Model.)
E. C. CLARK.
WHEEL LOCK FOR VEHICLES.
No. 269,262. Patented Dec. 19, 1882.
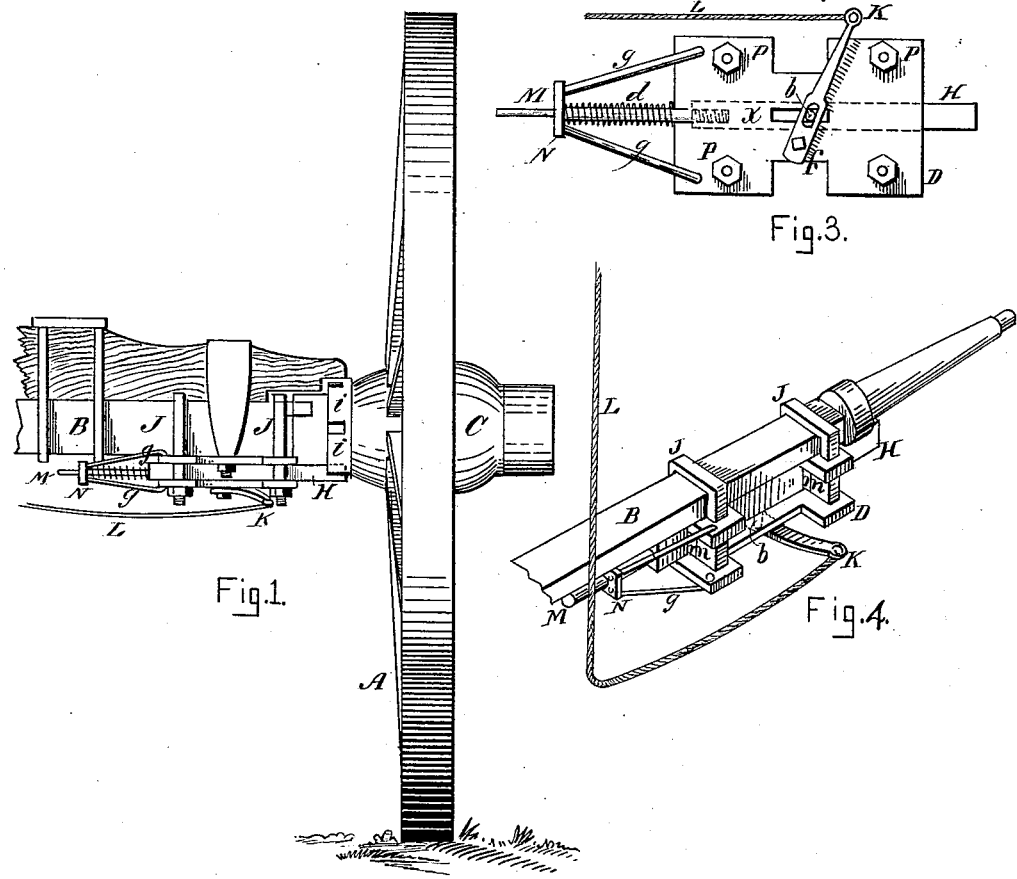
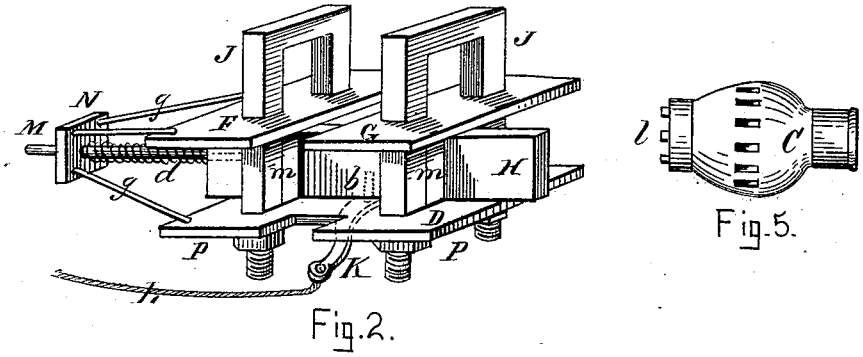
Witnesses:
Alfred Fawcett
H. E. Remick
Inventor:
Edward Clarence Clark
per C. C. Shaw
Atty.

UNITED STATES PATENT OFFICE.

EDWARD C. CLARK, OF BOSTON, MASSACHUSETTS, ASSIGNOR TO HIMSELF AND SAMUEL J. WILKINSON, OF SAME PLACE.

WHEEL-LOCK FOR VEHICLES.

SPECIFICATION forming part of Letters Patent No. 269,262, dated December 19, 1882.

Application filed September 30, 1882. (No model.)

*To all whom it may concern:*

Be it known that I, EDWARD C. CLARK, of Boston, in the county of Suffolk, State of Massachusetts, have invented a certain new and useful Improvement in Wheel-Locks for Vehicles, of which the following is a description sufficiently full, clear, and exact to enable any person skilled in the art or science to which said invention appertains to make and use the same, reference being had to the accompanying drawings, forming a part of this specification, in which—

Figure 1 is a side elevation, showing the lock applied to the axle; Fig. 2, an isometrical perspective view of the lock detached; Fig. 3, a bottom plan view of the lock; Fig. 4, an isometrical perspective view of the lock attached to the axle, and Fig. 5 a view showing a modified form of hub adapted for use with the lock.

Like letters of reference indicate corresponding parts in the different figures of the drawings.

My invention relates to an improved method of instantaneously locking or securing the wheels of vehicles or carriages in such manner as to prevent the wheels from turning on their axles, and thus cause the carriage to stop and remain stationary in any desired position at the will of the driver or person in charge of the same; and it consists in a novel construction and arrangement of the parts, as hereinafter more fully set forth and claimed, by which a simpler and more effective device of this character is produced than is now in ordinary use.

The nature and operation of the improvement will be readily understood by all conversant with such matters from the following explanation, its simplicity rendering an elaborate description unnecessary.

In the drawings, A represents the wheel, B the axle, and C the hub of the carriage or vehicle wheel.

The lock proper consists principally of the bed-plate D, cap-plates F G, which may be made in one, if desired, bolt H, spring $d$, and clamps or hangers J. The bolt is arranged to slide horizontally in line with the axle between the bed and cap plates, which are kept apart or from unduly bearing on the bolt by the lifts $m$. The bed-plate D is slotted, as seen at $x$, Fig. 3, and pivoted to the under side of the same. At $f$ is a lever, K, provided with a cord, H, attached to its outer or free end. A stud, $b$, projects downwardly from the bolt L and works in a short slot in the lever K, as best seen in Fig. 3, thereby operatively connecting the bolt and lever.

Extending from the inner or rear end of the bolt on its central line there is a rod, M, working in a hole through the plate N, said plate being held in position by the braces $g\ g$, attached to the plates F D. Disposed around this rod there is a coiled spring, $d$, one end of which abuts against the inner face of the plate N and the other against the inner end of the bolt H, the spring acting expansively to force the bolt into contact with the hub of the wheel when the lock is in use.

The hub C, Fig. 1, is provided with a series of notches or serrations, $i\ i$, in its inner band, which are of proper size, and adapted to receive the outer end of the bolt in locking the wheel. A modification of the hub is shown in Fig. 5, which has a series of studs or pins projecting horizontally from its inner end.

The lock is attached to the axle of the vehicle by the clamps J, which pass around the same, as seen in Figs. 1 and 4, and are secured in position by the nuts P.

The cord L is designed to pass around proper pulleys (not shown) and up to the seat of the driver in charge of the vehicle, where it is drawn taut and secured by proper appliances in such a manner as to withdraw the bolt H from contact with the hub C by means of the lever K.

In the use of my improvement, when it is desired to lock the wheels of the vehicle, the cord is released, permitting the spring $d$ to force the bolt into one of the notches $i$, and thus prevent the wheel from turning on its axle in a manner which will be readily understood without a more explicit description.

It will be obvious that the invention is well adapted for either light or heavy vehicles, and its importance will be readily appreciated without being more especially alluded to.

Having thus explained my invention, what I claim is—

1. A carriage-wheel lock consisting of parallel bed and cap plates, interposed lifts between said plates, a spring-pressed bolt which slides horizontally between said plates and is adapted to lock into notches on the wheel-hub, said bolt being provided with a stud which projects through a slot of the base-plate, a lever pivoted to said base-plate and provided with a slot into which said stud projects, means for operating said lever, and U-shaped bolts or hangers passing through said plates, whereby the device may be readily attached to a vehicle-axle, substantially as described.

2. A carriage-wheel lock consisting of parallel bed and cap plates, interposed lifts between said plates, a spring-pressed bolt which slides horizontally between said plates and is adapted to lock into notches on the wheel-hub, a vertical slotted plate in which the extension of said bolt slides, braces connecting said vertical plate with the cap and base plates, a slotted lever pivoted to said base-plate, a stud on said bolt, which passes through a slot in the base-plate and into the slot of the lever, and means for attaching the parts to a carriage-axle, substantially as described.

EDWARD C. CLARK.

Witnesses:
C. A. SHAW,
J. NEAL.